(12) United States Patent
Arhab et al.

(10) Patent No.: US 6,640,945 B2
(45) Date of Patent: Nov. 4, 2003

(54) HYDROKINETIC COUPLING APPARATUS, IN PARTICULAR FOR MOTOR VEHICLE, COMPRISING IMPROVED MEANS LINKING THE PISTON WITH THE COVER

(75) Inventors: Rabah Arhab, Saint-Brice-Sous-Foret (FR); Alexandre Depraete, Amiens (FR); Daniel Satonnet, Paris (FR); Norbert Termenon, Amiens (FR)

(73) Assignee: Valeo, Paris (FR)

( * ) Notice: Subject to any disclaimer, the term of this patent is extended or adjusted under 35 U.S.C. 154(b) by 5 days.

(21) Appl. No.: 10/048,887

(22) PCT Filed: Jun. 28, 2001

(86) PCT No.: PCT/FR01/02079

§ 371 (c)(1),
(2), (4) Date: Feb. 6, 2002

(87) PCT Pub. No.: WO02/01092

PCT Pub. Date: Jan. 3, 2002

(65) Prior Publication Data

US 2002/0134632 A1 Sep. 26, 2002

(30) Foreign Application Priority Data

Jun. 29, 2000 (FR) .............................................. 00 08431

(51) Int. Cl.⁷ .............................................. F16H 45/02
(52) U.S. Cl. .................................. 192/3.29; 192/70.18
(58) Field of Search .............................. 192/3.29, 3.28, 192/3.3, 70.18, 112

(56) References Cited

U.S. PATENT DOCUMENTS

| | | | | |
|---|---|---|---|---|
| 5,215,173 A | * | 6/1993 | Gimmler | 192/3.3 |
| 5,383,540 A | * | 1/1995 | MacDonald | 192/3.29 |
| 5,515,956 A | * | 5/1996 | Schoder et al. | 192/3.29 |
| 5,553,693 A | * | 9/1996 | Schoder et al. | 192/3.29 |
| 5,732,804 A | * | 3/1998 | Wienholt | 192/3.29 |
| 6,193,036 B1 | * | 2/2001 | Arhab et al. | 192/3.29 |

FOREIGN PATENT DOCUMENTS

WO          WO 98 53225 A      11/1998

* cited by examiner

*Primary Examiner*—Saul Rodriguez
(74) *Attorney, Agent, or Firm*—Liniak, Berenato & White (57) ABSTRACT

The invention concerns a hydrokinetic coupling apparatus comprising a wall (36) with globally transverse orientation and a central ring (52) along which the piston (50) is mounted sealingly sliding to define a control chamber (38) with variable volume, and comprising an annular disc (92) linking in rotation the piston (50) with the ring (52), which is axially arranged between the transverse wall and the piston (50), which is linked to the piston by elastically deformable tabs (90) and which comprises a central part (96) extending radially inwards opposite an inner surface (98) of the transverse wall (36) against which it is axially pressed and whereto it is fixed. The invention is characterised in that the ring (52) is axially secured to the central part (96) of the linking annular disc (92) relative to which the ring (52) is radially centered.

18 Claims, 12 Drawing Sheets

HYDROKINETIC COUPLING APPARATUS, IN PARTICULAR FOR MOTOR VEHICLE, COMPRISING IMPROVED MEANS LINKING THE PISTON WITH THE COVER

The present invention relates to a hydrokinetic coupling apparatus, especially for a motor vehicle, of the type described and shown for example in the document WO-A-94/07058.

That document describes and shows an apparatus of the type comprising a generally transversely oriented wall adapted to be coupled in rotation to a driving shaft and carrying a so-called guide sleeve fixed centrally to it, a piston mounted for sealed sliding movement along a cylindrical surface of the sleeve and defining, with the sleeve and the transverse wall, a variable volume chamber which is bounded radially on the outside by an annular ring, together with friction liners which are adapted to be gripped axially, respectively, between the piston and the annular ring and between the annular ring and the internal face of the transverse wall.

In one known embodiment which is described and shown in the document FR-A-2 702 262, it is known to provide an annular disc for driving the piston in rotation by means of the sleeve, the disc being coupled in rotation and axially to the latter and being connected to the piston by means of elastically deformable tongues, the disc extending radially inwards in facing relationship with a transversely oriented annular surface portion of the sleeve against which it is in axial engagement.

In accordance with the embodiment described and shown in the said document, the central sleeve is fixed to the driving disc, or coupling disc, firstly by means of a set of complementary teeth or splines which are formed, respectively, in the circular inner edge of the driving disc and in an axial end portion of the said cylindrical surface of the sleeve, and secondly, by an end seaming operation which immobilises the splined driving disc axially in axial abutment against the annular surface portion of the sleeve.

A disadvantage of this solution is that it calls for relatively complex forming and/or machining operations on the driving disc and the central sleeve, and it requires a seaming operation, which is difficult to perform without involving accidental deformations of the components, and which makes it necessary to use for the central sleeve a steel such that it can be machined and deformed so that it can be seamed.

In order to overcome these drawbacks, the document FR-A-2 749 632 proposed a solution in which the design of the sleeve is much simplified, and in which the coupling disc includes a central portion which extends radially inwards and is welded to the sleeve, the coupling disc with its central portion being interposed axially between the piston and the turbine wheel. That design simplifies the means for coupling and fastening together the coupling disc and sleeve, but it provides no solution as to centring and fastening of the sleeve, in particular with respect to the transverse wall of the cover plate, while fastening and centring of the sleeve in this case make it necessary to form a central hole in the wall and then to carry out a welding operation.

The design of the transverse wall of the cover plate is therefore complicated, as are the sealing arrangements of the apparatus generally.

The document FR-A-2 766 894 proposed a further design, in which the coupling disc is disposed between the piston and the transverse wall of the cover plate, and it has a central portion which extends radially inwards and which is interposed axially between a facing portion of the sleeve and a facing portion of the inner face of the cover plate.

In the design described in that document, and in its various embodiments, the central portion of the coupling disc is fixed either to the transverse wall or to the sleeve, and the latter is fixed and centred with respect to the cover plate in the same way as in the document FR-A-2 749 632, that is to say by means of a hole in a central sleeve which is formed for this purpose in the transverse wall of the cover plate, and by means of a welding operation.

The document FR-A-2 634 849 further proposes another design in which the coupling disc is disposed axially between the piston and the transverse wall of the cover plate, and here again it is coupled in rotation and coupled axially with the sleeve by splined coupling means and by an operation of welding or seaming.

As in the document mentioned earlier, the sleeve is centred and fixed axially through a central hole in the transverse wall of the cover plate.

The invention aims to propose a new design for an apparatus of the type set forth above, including a coupling disc the design of which is simple, and which, in particular, enables a cover plate to be used having a transverse wall with no central hole for fastening and centring of the sleeve.

To this end, the invention proposes hydrokinetic coupling apparatus, especially for a motor vehicle, of the type including a generally transversely oriented wall adapted to be coupled in rotation to a driving shaft, a central sleeve, and a piston mounted for sealed sliding movement along a cylindrical surface of the central sleeve and defining, with the sleeve and the transverse wall, a variable volume control chamber which is bounded radially on the outside by at least one annular ring which is adapted to be gripped between the piston and the internal rear face of the transverse wall, and of the type comprising an annular disc for coupling the piston in rotation with the sleeve, which is disposed axially between the piston and the transverse wall, and which includes a central portion extending radially inwards in facing relationship with an annular internal surface portion of the transverse wall, against which it is in axial engagement and to which it is directly or indirectly fixed, characterised in that the sleeve is attached axially to the said central portion of the annular coupling disc, with respect to which the sleeve is radially centred.

According to further features of the invention:

- the central portion of the coupling disc is interposed axially between an annular transverse front end surface of the sleeve and the said annular rear inner surface portion of the transverse wall.
- the central portion of the coupling disc is fixed to the said annular front transverse end surface of the sleeve by welding or adhesive bonding.
- the central portion of the coupling disc is fixed to the said annular transverse front end surface of the sleeve by seaming.
- the central portion of the coupling disc is fixed to the said annular front transverse end surface of the sleeve in elastic mating engagement in the axial direction.
- the sleeve includes a convex cylindrical surface for centring the central portion of the coupling disc.
- the central portion of the coupling disc extends radially inwards beyond the sleeve, in particular to constitute a calibrated orifice for supplying oil to the control chamber.
- the central portion of the coupling disc is made in one piece with the sleeve.

- the central portion of the coupling disc is extended by at least one axially oriented annular first portion which extends towards the rear, and of which the convex cylindrical peripheral surface constitutes the said cylindrical surface for sliding movement of the piston.
- the said axially oriented annular first portion is extended radially inwards by a radially oriented annular portion, and then by an axially oriented second annular portion which extends forward towards the inner face of the transverse wall.
- the free front terminal edge of the said axially oriented annular portion is in axial engagement against the said annular rear internal surface portion of the transverse wall.
- the free front terminal edge of the said axially oriented annular second portion is welded to the said annular rear internal surface portion of the transverse wall.
- the central portion of the coupling disc is extended radially inwards by an axially oriented annular portion extending towards the rear, and in that an annular element constituting a hub is interposed radially between the convex cylindrical peripheral surface of the axially oriented annular portion and the piston which is mounted for sliding movement on the convex cylindrical peripheral surface of the said annular element.
- the central portion of the coupling disc is fixed to the said annular rear internal surface portion of the transverse wall by welding or adhesive bonding.
- fluid feed passages for the generally radially oriented variable volume control chamber are formed at the interface between the central portion of the coupling disc and the said annular rear internal surface portion of the transverse wall, and/or at the interface between the sleeve and the central portion of the coupling disc.
- the said passages are formed in bosses, slots and/or holes formed in the transverse wall and/or in the central portion of the coupling disc and/or in the sleeve.
- the annular coupling disc is connected to the piston by means of elastically deformable tongues.
- the elastically deformable tongues are made in one piece with the coupling disc.

Further features and advantages of the invention will appear on a reading of the following detailed description, for an understanding of which, reference will be made to the attached drawings, in which.

In the following description those components which are identical, similar or analogous will be designated by the same reference signs.

Figure 1:
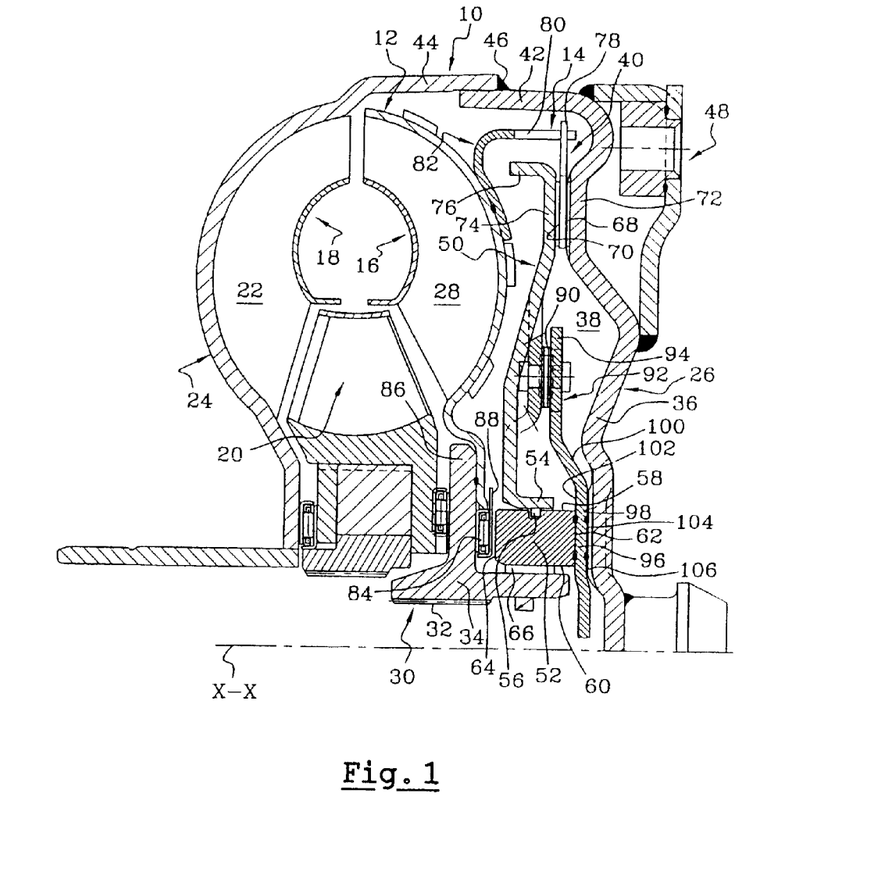
FIG. 1 is a half view in axial cross section showing the main components of a hydrokinetic coupling apparatus in a first embodiment of the invention.

To facilitate understanding of the description and Claims, there will be used, by way of non-limiting example, rear and front orientations which correspond respectively to the left and right hand sides of FIG. 1 and similar Figures.

As is known in the state of the art, a hydrokinetic coupling apparatus includes, arranged in a common sealed housing 10 filled with oil and constituting a casing, a torque converter 12 and a lock-up clutch 14.

The torque converter 12 comprises a turbine wheel 12, an impulse wheel 18 and a reaction wheel 20.

The impulse wheel 18 has blades 22 which are carried by a first half shell 24, which is sealingly secured to a driving second half shell 26 arranged to be coupled in rotation to a driving shaft.

The turbine wheel 16 also has blades 28 which face towards the blades 22 of the impulse wheel 18, and the turbine wheel 16 is coupled in rotation to a hub 30 which is arranged to be coupled in rotation to a driven shaft (not shown) coaxial with the axis X—X of the apparatus, by means of splines 32 formed on the inner periphery of the radially inner portion 34 of the hub 30.

The driving half shell 26 consists essentially of a generally transversely oriented wall 36, that is to say this wall lies in a radial plane at right angles to the axis X—X.

As can be seen in particular in FIG. 1, the turbine wheel 16 is fitted axially between the transverse driving wall 36 at the front and the impulse wheel 22 at the rear.

The lock-up clutch 14 is fitted axially between the assembly that consists of the turbine wheel 16 with its hub 30, on the one hand, and the transverse front driving wall 36 on the other hand.

The two half shells, the rear one 24 and front one 26, constitute the sealed casing or housing 10 which, by means of its driving front half shell 26, constitutes the input element of the hydrokinetic coupling apparatus, while the hub 30 of the turbine wheel 60 is the output element of the apparatus.

In the case of application to a motor vehicle, the driving shaft consists of the crankshaft of the internal combustion engine of the vehicle (not shown), while the driven shaft consists of the input shaft of the transmission of the vehicle (not shown).

The said driven shaft has a central hole to act as a channel for feeding hydraulic fluid under pressure to a variable control chamber 38 which is delimited by the components of, firstly, the lock-up clutch 14, which comprise an annular disc 40 coupled in rotation releasably to the assembly consisting of the turbine wheel 16 and its hub 30.

During starting of the vehicle, the turbine wheel 16 is driven in rotation by the impulse wheel 18 by the flow of the oil contained in the sealed casing 10 between the blades 28 of the turbine wheel 16 and the blades 22 of the impulse wheel 18.

The lock-up clutch 14 is then disengaged, and the torque converter 12 is in service or in operation.

In order to avoid a loss of power which is due in particular to sliding effects between the turbine wheel 16 and impulse wheel 18, the turbine wheel 16 is subsequently, after starting of the vehicle, coupled solidly to the driving front half shell 26 through the lock-up clutch 14, which is therefore engaged, the converter 12 being then out of service.

In particular, reference may be made to the contents of the document WO-A-94/07.058 to find further details relating to the known structure and operation of a hydrokinetic coupling apparatus of this kind.

The driving front half shell 26 is a metal pressing, and it includes at its radially outer periphery an axially oriented annular flange which extends towards the rear, and which in this example is received radially within a complementary axially oriented annular flange 44 which is part of the rear half shell 24, for assembly and closing of the sealed housing or casing 10, for example by means of a weld seam 46.

According to one aspect of the invention, and as can be seen in particular in FIG. 1, the front transverse wall 36 of the driving half shell 26 is continuous in its central part, that is to say it has no machined aperture, nor any integral hole.

The construction of the driving front half shell 26 is therefore particularly simple, simply obtained by press-forming, and because of its design it is generally sealed because it has no central hole or other peripheral hole, for example for carrying out fastening operations by riveting internal components to the housing 10.

As can be seen in FIG. 1, the transverse front wall 36 carries, close to its periphery, elements 48 for coupling the half shell 26 in rotation to the crankshaft of the engine of the vehicle in a known way, by means of an interposed face plate not shown in the drawings.

The lock-up clutch 14 comprises a piston 50 which is a component having the general form of a transversely oriented disc with a central hole, and which is mounted for axial movement in both directions and in sealed sliding movement on a central annular sleeve 25, called a guide sleeve, for guiding the piston, although guidance in axial displacement and in sealed sliding movement of the piston are ensured in this case by tongues.

For this purpose, the piston 50 includes a radially inner portion 54 made in the form of an axially oriented annular tube element which is mounted for sliding movement, with a sealing ring 56 interposed, on a cylindrical convex bearing surface constituted by the outer peripheral wall of the sleeve 52.

In the embodiments shown in succession in FIGS. 1 to 16, the design of the central sleeve is particularly simple, and is in the form of a monobloc cylindrical annular sleeve which is delimited radially by an outer peripheral surface 58 and a concave internal cylindrical surface 60, and, axially, by two annular transverse end faces, namely a front face 62 and a rear face 64.

The centring sleeve 62, by virtue of its concave radially inner surface 60, guides the turbine wheel 60 in rotation with respect to the hub 30, with a sleeve bearing 66 interposed.

Thus, the piston 50, with the central sleeve 52 and the transverse front end wall 36, delimits the variable volume control chamber 38 which is delimited radially on the outside by the disc 40 and by the front friction disc 68 and rear friction disc 70, which are adapted to be gripped respectively between the disc or annular ring 40 and the facing, radially outward, portion 72 of the transverse wall 36, on the one hand, and between the disc 40 and the facing, radially outer, portion 74 of the piston 50.

Each friction liner 68, 70 is coupled to one of the elements of the assembly 36, 40, 50, and the two liners 68 and 70 may for example be carried by the opposed transverse faces of the disc 40.

The disc 40 is the output element of the lock-up clutch 14, and in this example it extends radially outwards beyond the annular peripheral portion 76 of the piston, that is to say radially outside the piston with reference to FIG. 1.

As in a known arrangement, the radially outer periphery 78 of the disc 40 meshes with an axially oriented complementary portion 80 of a member 82 which is coupled in rotation to the turbine wheel 16, in this example by welding.

Without departing from the scope of the invention, it is of course possible to provide an elastic damping device disposed at the periphery of the clutch 14, of the type comprising for example circumferentially acting springs.

With reference in particular to FIG. 1, it will be seen that a needle thrust bearing 84 is interposed axially between the annular transverse rear end face 64 of the central sleeve 52 and the hub 30.

More precisely, the thrust bearing 84 is interposed between the central sleeve 62, 64 and a radially oriented plate portion 86 which is an outward radial extension of the hub, and on which the turbine wheel 16 is welded.

The front ring of the needle bearing 64 is extended radially outwards by a ring 88, which acts as a thrust ring taking rearward axial thrusts from the piston 50.

When the clutch 14 is engaged, the turbine wheel 16 is coupled to the transverse wall 36 of the front half shell 26, so that either no relative movement takes place between the turbine wheel 16 and impulse wheel 18, or else, if sliding movement does occur, it is limited as a function of the axial engagement of the clutch.

When the clutch 14 is engaged, the turbine wheel 16 is driven in rotation by the impulse wheel 18.

In the known way, the piston 50 is coupled in rotation to the transverse wall 36, which turns and is fixed axially by means of generally tangentially oriented resilient tongues 90, which are fixed to a driving or coupling member 92 so that the piston 50 is coupled in rotation to the transverse wall 36, while being displaceable axially in both directions with respect to the latter by sliding axial movement along the central sleeve 52, 58.

In this description, in the interests of simplicity, the word "tongues" is to be understood to mean either tongues which act in isolation, or tongues which result from a stack of elementary tongues in the manner known in the state of the art.

In the various examples shown in the drawings, the resilient tongues 90 are oriented tangentially, and they are riveted at one of their tangential ends to the piston 50, and at their other tangential end, opposed to the first, to the coupling or driving member 92.

The tongues 90 are spaced apart at regular intervals in a circle, and in this example there are for example six of them.

In accordance with a known arrangement, it will be noted that the piston 50 may be deformed locally towards the front transverse wall 36 for fastening of the elastic tongues 90, and these deformations also stiffen the piston 50.

The invention is not limited to the case in which the piston is connected through elastic tongues, as the driving or coupling member may for example cooperate with catches.

As can be seen in the drawings, the coupling member 92 is generally in the form of a generally radially or transversely oriented annular disc, and it has peripheral lugs 94 to which the corresponding tangential ends of the tongues 90 are fixed.

Because of the arrangement of the lugs 94 at the outer radial periphery of the coupling disc 92, gaps are thereby formed between the lugs 94 which enable access to be obtained to the piston 50 for the purpose of riveting the tongues 90 to the piston 50.

In all embodiments of the invention, the tongues 90 and the coupling disc 92 are disposed axially between the piston 90 and the front transverse wall 36, that is to say within the variable volume control chamber 38.

Because of the arrangement of the complementary portions 78 and 80, and because they are meshed together, the disc 40 is coupled in rotation to the turbine wheel 60, but it is displaceable axially with respect to the latter in such a way as to enable it to be gripped axially under the action of the piston 50.

The radially outer lugs 94 of the coupling disc 92 lie in a radial plane which is offset axially towards the rear with respect to the central portion 96 of the coupling member 92, this central portion being in the form of an annular ring portion which is interposed axially between the central sleeve 52 and a facing internal annular surface portion 98 of the front transverse wall 36 which is oriented axially towards the rear.

The lugs 94 are connected to the central portion 96 by means of a frustoconical intermediate annular portion 100.

In accordance with the features of the invention, and for example in the first embodiment shown in FIG. 1, the central portion 96 of the coupling disc 92 is fixed to the transverse wall 36 by welding, while the central sleeve 52 is also welded to the central portion 96 of the coupling disc 92.

More precisely, the transverse annular front end face 62 of the central sleeve 52 is welded to a facing portion of the transverse rear face 102 of the central portion 96 of the coupling disc 92, while the transverse front face 104 of the central portion 96 is welded on the facing portion of the annular rear internal surface 98 of the transverse wall 36.

More precisely, the said annular surface 98 comprises, in this example, a set of bosses 106 which are spaced apart here at regular intervals circumferentially, and which extend axially inwards, with the central portion 96 being welded on their transverse rear faces so as to define, between the bosses and between the facing transverse surfaces of the central portion 96 and the transverse front wall 36, a corresponding number of generally radially oriented passages that put the chamber 38 into communication with the interior of the assembly, for the purpose of feeding oil under pressure to the chamber 38.

The welding operations may for example be carried out by welding at right angles to the centring sleeve 52, in particular by capacitor discharge resistance welding. The welding operation can also be carried out by a transparency through the transverse wall 36.

It will be noted that the zones fastened together by welding or adhesive bonding are situated radially inwards of the piston 50, that is to say, with reference to FIG. 1, below the radially inner portion 54 of the piston 50.

Radial centring, and attachment or axial fastening of the central sleeve 52 are therefore, in this case, obtained by fastening it on the central portion 96 of the coupling disc 92, without it being necessary to apply any modification to the continuous transverse wall 36.

The components can be assembled in the following way.

The coupling disc 92 is assembled to the piston 90 by means of the elastic tongues 90, which are secured by riveting operations. Centring and fastening of the central sleeve 52 on the central portion 96 of the coupling disc 92 is then carried out.

The sub-assembly consisting of the central sleeve 52, piston 50, tongues 90 and coupling disc 92, with the annular ring 40, is then fitted axially into the front half shell 26, and assembly is then completed by the welding operation by which the coupling disc 92 is fixed and coupled in rotation to the transverse wall 36 of the driving front half shell 26.

Apart from the great simplicity of design and manufacture of the three components consisting of the central sleeve 52, the coupling disc 92 with its coupling and fastening central portion 96, and the front half shell 26 with the simplified central portion of its transverse wall 36, it is found that the arrangement according to the invention is reduced in axial size, with the only slight increase in size being the result of the thickness of the central portion interposed axially between the central sleeve 52 and the transverse wall.

In addition, the part which consists of the central sleeve 52, piston 50 and coupling disc 92 is a sub-assembly which is particularly easy to assemble and then to position and, in particular, to centre radially with respect to the half shell 26 before the final welding operation, with the disc 40 being interposed between the piston and the half shell, and before the final assembly operation of the casing by mating engagement and welding together of the two half shells.

The welding operations just described, between the sleeve and the central portion 92, and between the central portion 92 and the transverse partition 36, can of course be replaced by adhesive bonding operations.

As can be seen in FIG. 1, the central portion 96 of the coupling disc 92 extends radially inwards from the fastening zones in which it is secured to the sleeve 52 and wall 36, and the central hole in the coupling disc can then constitute a calibrated oil feed orifice for the control chamber, so as to control the flow rate and/or the oil pressure.

The other embodiments, shown in particular in FIGS. 2 to 16, will now be described by comparison with the first embodiment shown in FIG. 1 and just described in detail.

Figure 2:
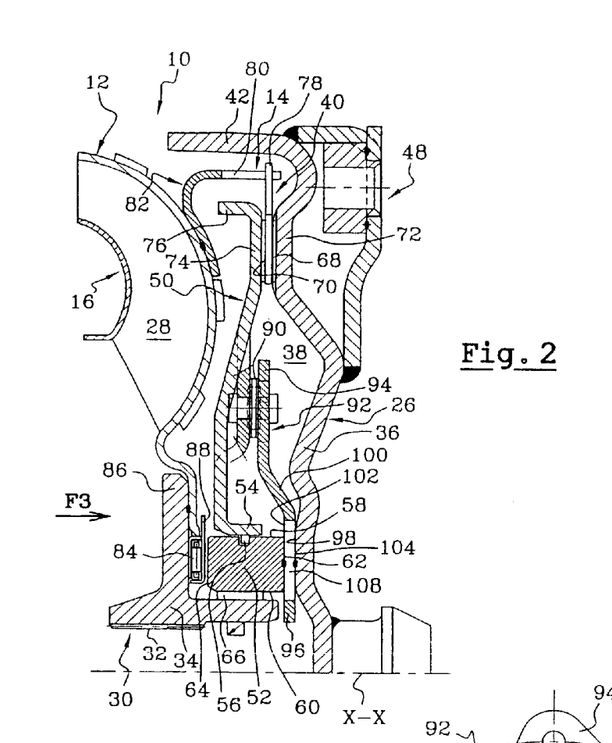
FIG. 2 is a view similar to part of FIG. 1, showing a second embodiment of the invention.
Figure 3:
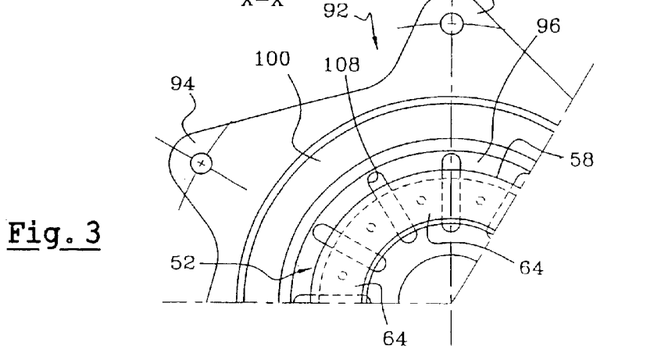
FIG. 3 is a scrap view in the axial direction of the arrow F3 in FIG. 2, and shows the centring sleeve and the coupling disc for the tongues.

In the second embodiment shown in FIGS. 2 and 3, only the manufacture of the radial passages for the pressurised oil is modified.

In this connection, the annular rear inner transverse surface portion 98 of the transverse wall 36 is smooth, that is to say it does not have any boss (as at 106 in FIG. 1), the radial passages being formed by virtue of holes 108 formed in the central portion 96 of the coupling disc 92 and spaced apart circumferentially at regular intervals, as can be seen in FIG. 3.

The welding or adhesive bonding zones between the sleeve 52 and the central portion 96, and between the latter and the transverse wall 36, are of course formed between the holes 108 of the central portion 96.

Figures 4, 6:
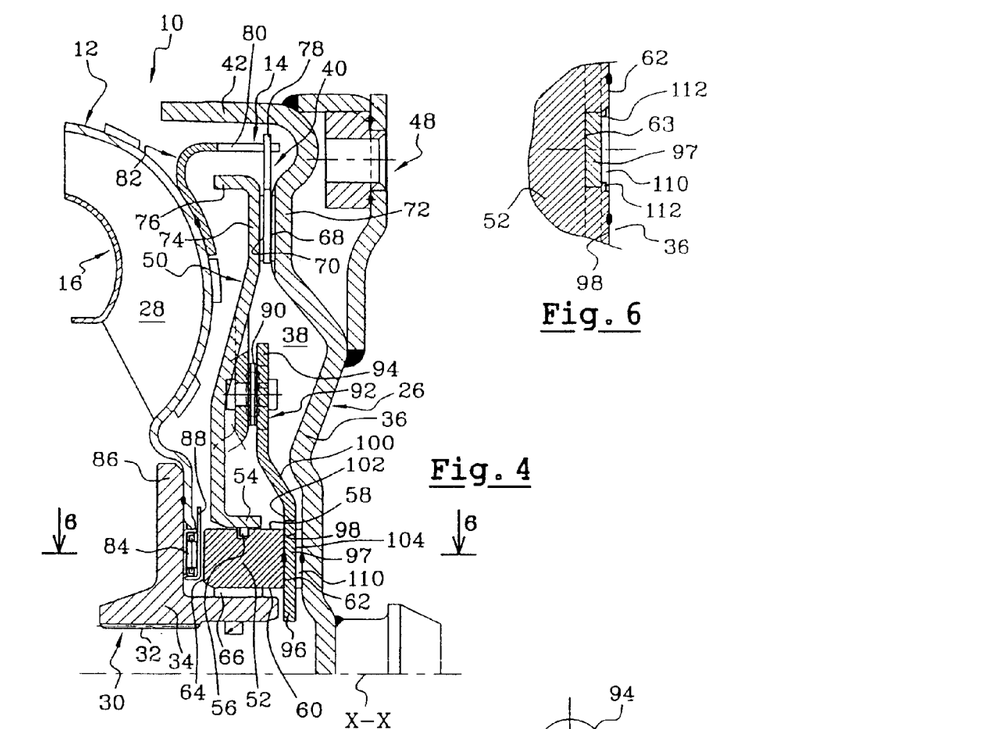
FIGS. 4 and 5 are views similar to those in FIGS. 2 and 3, and show a third embodiment of the invention.
FIG. 6 is part of a developed view taken in cross section on the line 6—6 in FIG. 4.
Figure 5:
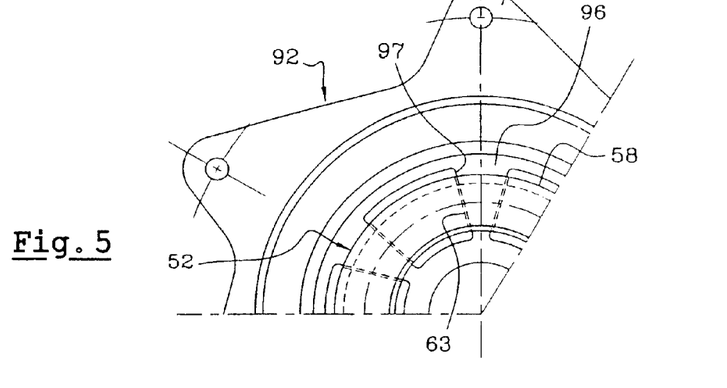

As regards the third embodiment shown in FIGS. 4 to 6, the coupling disc 92 is attached, through its central portion 96 to the central sleeve 52, by seaming.

For this purpose, the central sleeve 52 includes in its annular front transverse end face 62, recessed portions or openings 63 in which complementary lugs 97 of the central portion 96 of the coupling disc 92 are lodged.

The zones 112 situated on the edge of the recessed portions are upset mechanically so as to secure the coupling disc 92 with the central sleeve 52 both axially and circumferentially.

As can be seen in FIG. 6, the apertures 63 have an axial depth which is greater than the axial thickness of the tongues 90, so as to define holes or passages 110 to allow the passage of oil under pressure.

The seamed portions 112 can be seen in FIG. 6.

As can also be seen in FIG. 4, the final welding or adhesive bonding operation of the assembly consisting of the central sleeve 52, piston 50 and coupling disc 92 can in this example be carried out by welding the transverse front end face 62 which is in direct contact with the annular inner surface 98 of the transverse wall 36.

Figures 7, 8:
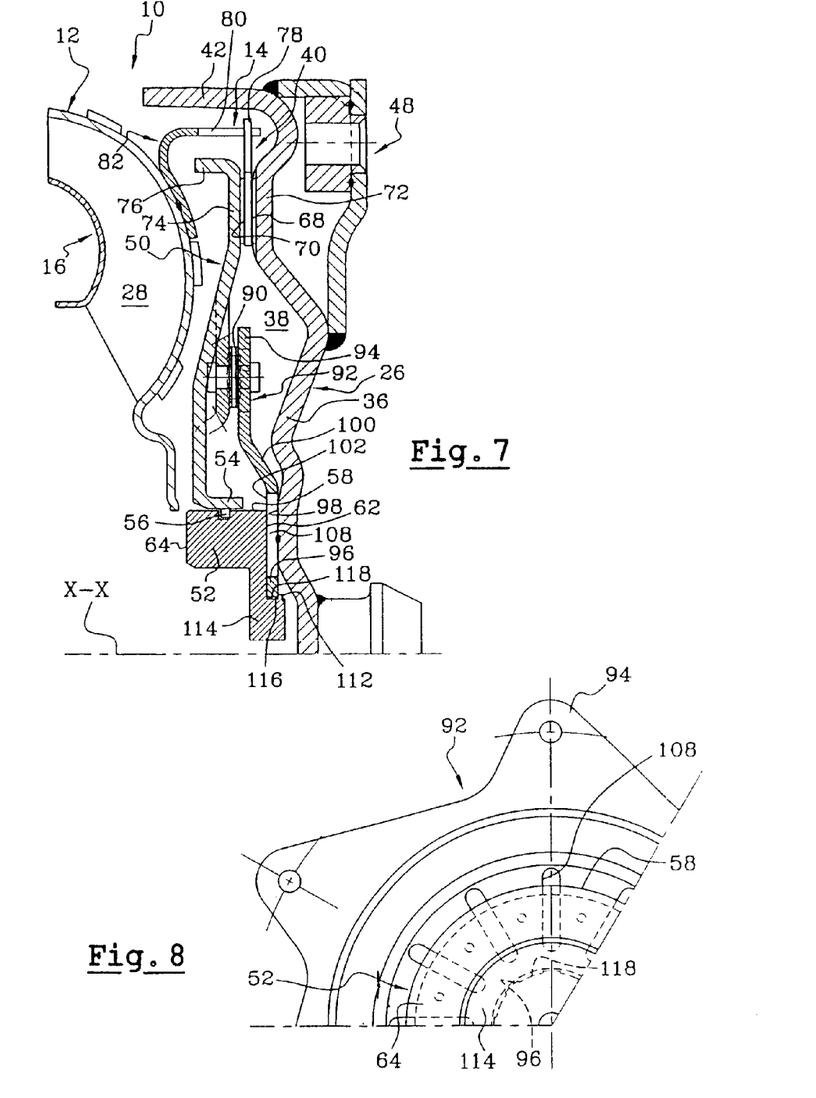
FIGS. 7 to 16 are five pairs of Figures, similar to FIGS. 2 and 3, showing the fourth to eighth embodiments of the invention respectively.

The fourth embodiment shown in FIGS. 7 and 8 is generally similar to the second embodiment, particularly as regards the design of the central portion 96 of the coupling member 92, which, in particular, includes holes 108 for the passage of oil under pressure.

On the other hand, the central portion 96 of the coupling disc 92 is secured both axially and in rotation to the central sleeve by a seaming operation.

For this purpose, the central sleeve 52 includes a radially inner portion 114 which, in combination with the annular transverse front end face 62, defines a seating in which the central portion 96 is received, the radially inner edge 116 of the portion 96 having splines complementary to those which are formed in the cylindrical outer annular edge 118 that constitutes the surface which receives the portion 96.

In this way, the central sleeve 52 is coupled in rotation with the coupling disc 92, and axial attachment between these two components is obtained by seamed portions 112.

Figure 9:
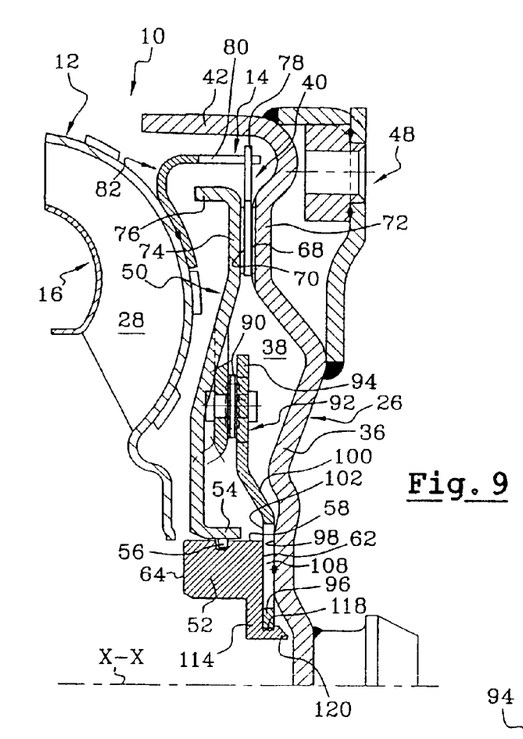
Figure 10:
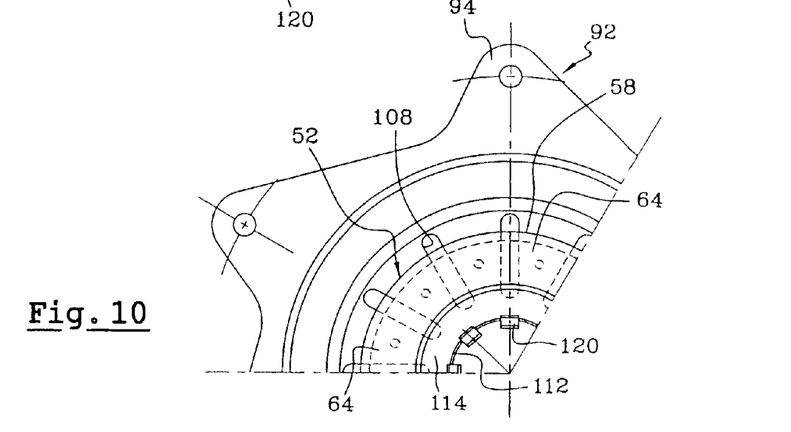

The fifth embodiment shown in FIGS. 9 and 10 is similar to the fourth embodiment, from which it differs only in the means for fastening the central portion 96 of the coupling disc 92 axially, and coupling it in rotation, with the extension 114 of the central sleeve 52.

In this connection, the central portion 94 in this case is inserted elastically from front to rear, that is to say from right to left with respect to FIG. 9, into the seating defined by the face 64 and the surface 118, mating engagement being effected by deformation of chamfered and elastically deformable hooks 120 which, in this case, are spaced apart circumferentially at regular intervals as can be seen in FIG. 10.

Coupling in rotation can be obtained by means of splines as in FIGS. 7 and 8, or else by means of notches formed in the inner edge 112 of the portion 96 and receiving the hooks 120.

Figure 11:
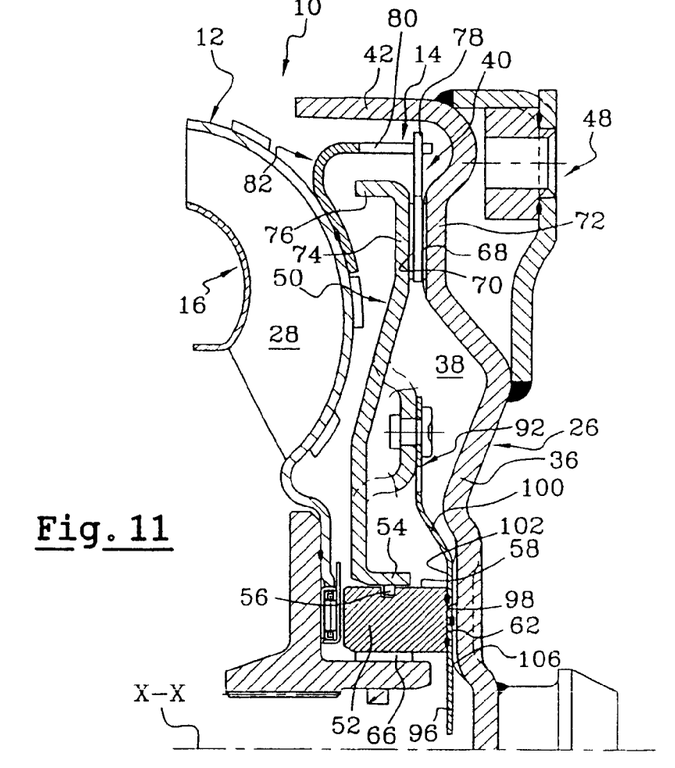
Figure 12:
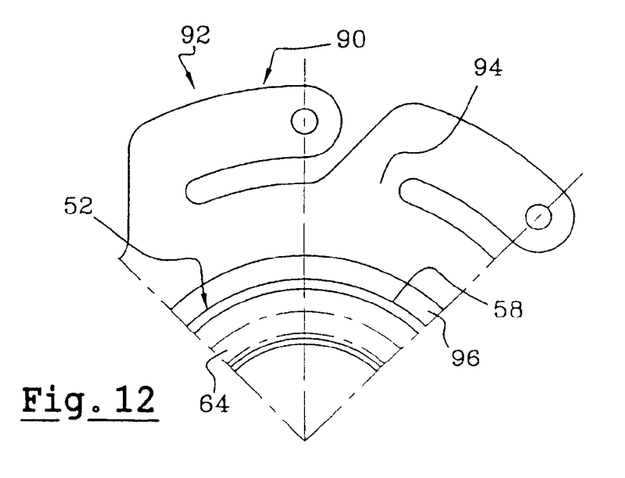

In the sixth embodiment shown in FIGS. 11 and 12, the overall design is generally similar to that in the first embodiment, but the tangential tongues 90 are made in one piece with the coupling disc 92, the latter being preferably formed from a metal sheet which is thinner than in the foregoing embodiments.

In addition, the means for fastening and coupling together the centring sleeve 52, the central portion 96 of the coupling disc 92, and the transverse wall 36, are in every way similar to those described and shown with reference to the first embodiment, that is to say by welding or adhesive bonding in the present case.

Figure 13:
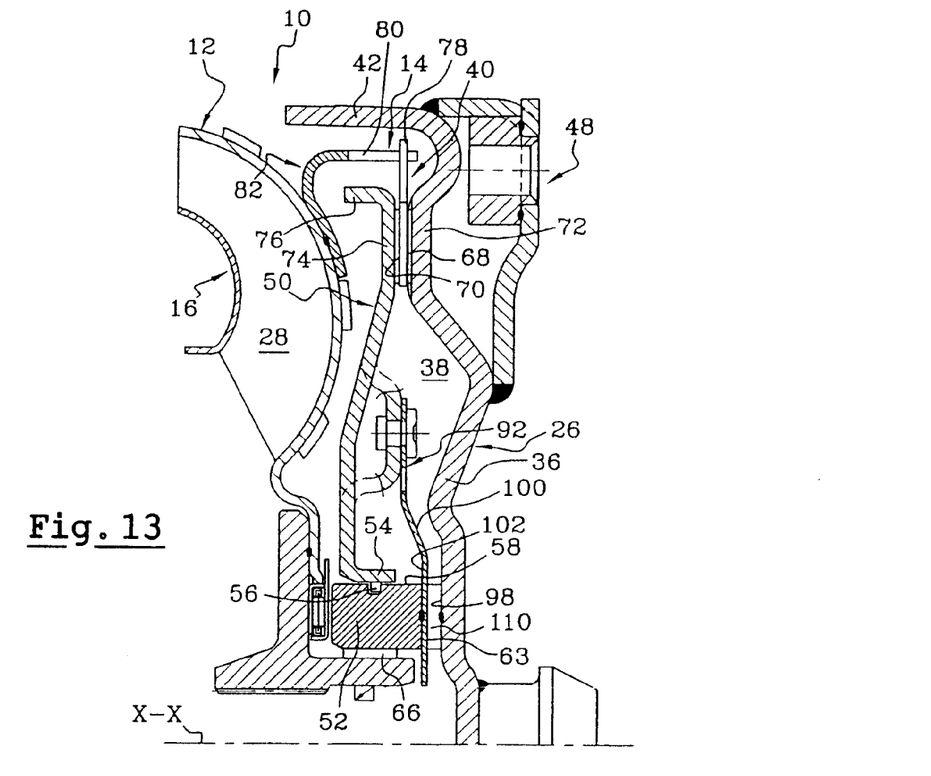
Figure 14:
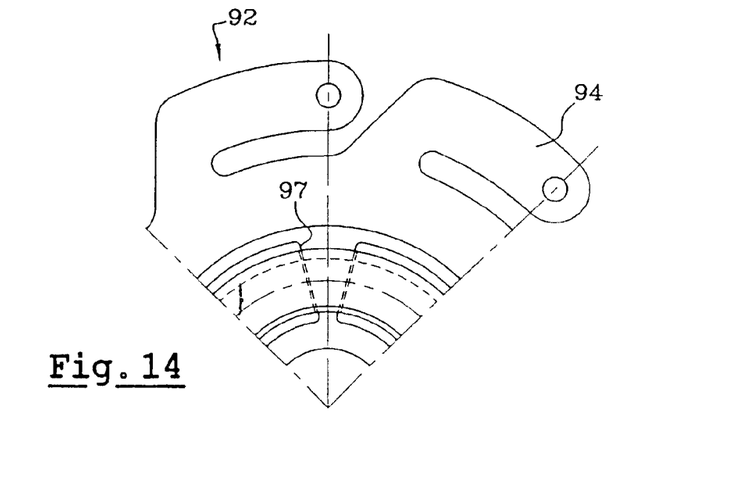

The seventh embodiment shown in FIGS. 13 and 14 corresponds to a combination of the arrangements of the sixth embodiment, in which the tongues 90 are made in one piece with the coupling disc 92, and the arrangements of the third embodiment in which the central sleeve and the central portion 96 of the coupling disc 92 are secured together by means of tongues received in the recessed portions 93, but here, the connection is not obtained by means of upset seamed elements 112, but by welding or adhesive bonding operations.

Figure 15:
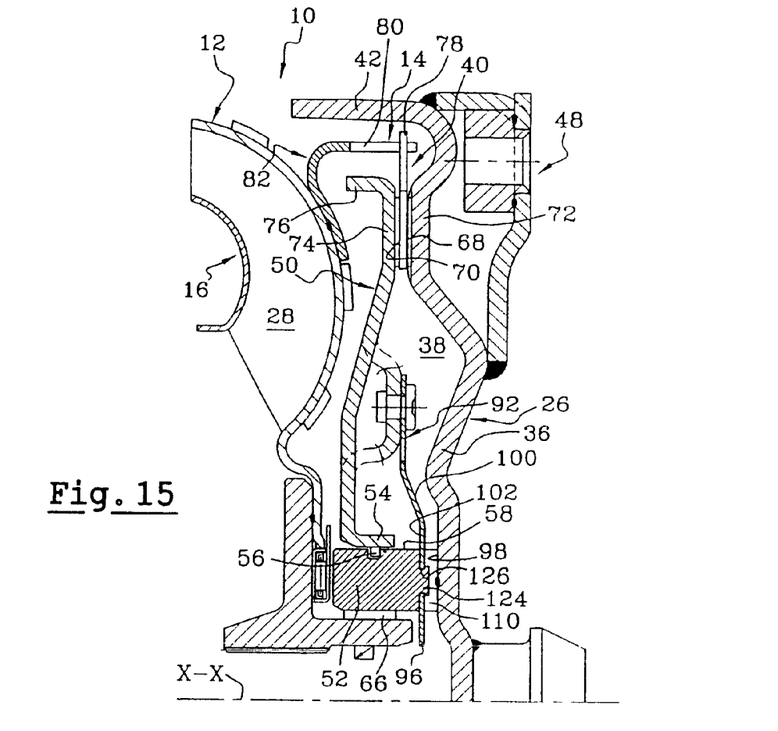
Figure 16:
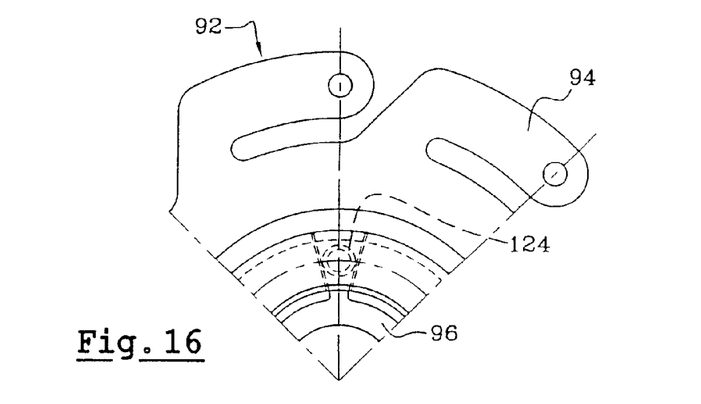

The eighth embodiment shown in FIGS. 15 and 16 is similar to the embodiment just described, the tongues 90 being seamed in position by upsetting bosses or heads 124 of the central sleeve 52, which are received in complementary holes 126 formed in the tongues of the central portion 96 of the coupling member 92, and which are upset in the same way as rivet heads.

Figure 17:
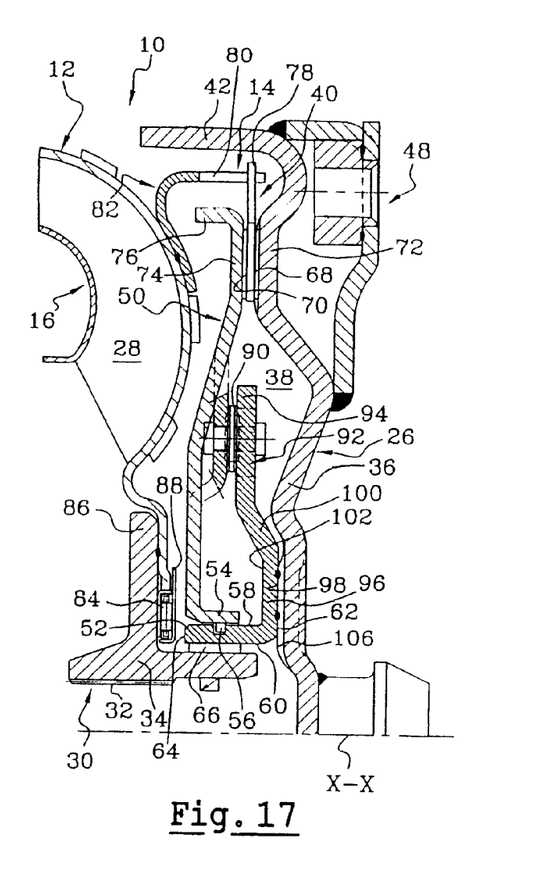
FIG. 17 is a view similar to that in FIG. 2, showing a ninth embodiment of the invention in which the centring sleeve is made in one piece with the coupling disc.

The ninth embodiment shown in FIG. 17 is different from all of the foregoing embodiments in that the central sleeve 52 is made in one piece with the coupling disc 92.

More precisely, the central portion 96 of the coupling disc 92, which is welded or adhesively bonded to the transverse wall 36, here as in the first embodiment shown in FIG. 1, is extended by an axially oriented tubular portion which projects towards the rear and constitutes the body of the sleeve 52, the radial thickness of which is of course very much less than in the foregoing embodiments.

This solution is therefore of particular advantage in that it simplifies even more the general design of the apparatus by eliminating some fabrication, machining and assembly operations.

Figure 18:
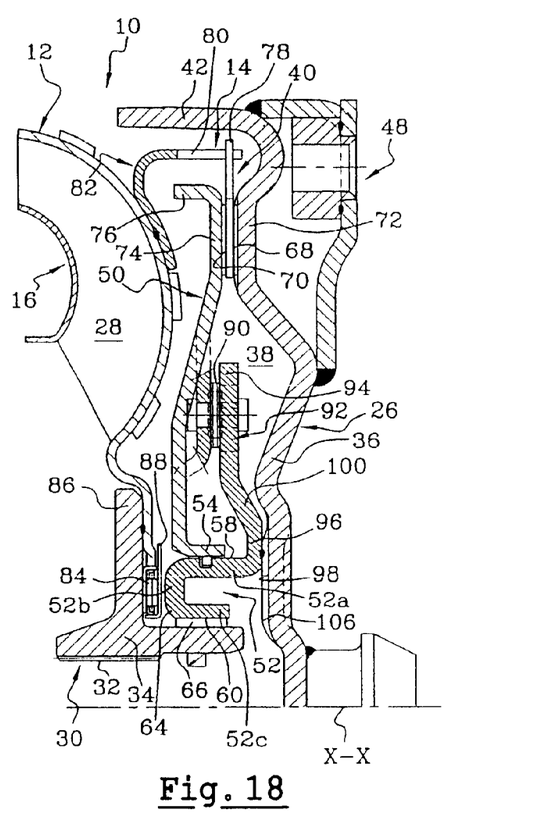
FIGS. 18 to 20 are views similar to that in FIG. 17, and show the tenth to twelfth embodiments of the invention respectively, in which the centring sleeve is made in one piece with the coupling disc.

The tenth embodiment shown in FIG. 18 is similar to the ninth embodiment, that is to say the central sleeve 52 is made integral, in one piece, with the coupling disc 92.

As in FIG. 17, the central portion 96 is extended by a first axially oriented tubular portion 52a which extends towards the rear, and then by a radially oriented annular portion 52b which extends inwards towards the axis X—X, and which is extended by a second axially oriented tubular portion 52c, which in its turn extends axially forward. The tubular portion 52c in this case is shorter than the tubular portion 52a, to allow oil to pass for feeding the chamber 38.

In this way, a central sleeve is reconstituted, to radial dimensions which are similar to those of the solid sleeve made in the form of a separate component, of the type shown for example in FIG. 1.

As in the case of the ninth embodiment, it is only the central portion 96 of the coupling disc 92 that is welded or adhesively bonded to the inner annular face 94 of the transverse wall with its bosses 106, and in this example within a zone which is situated radially further out than in the first series of embodiments, that is to say it is substantially in line with, or outside, the radially inner portion 54 of the piston 50.

Figure 19:
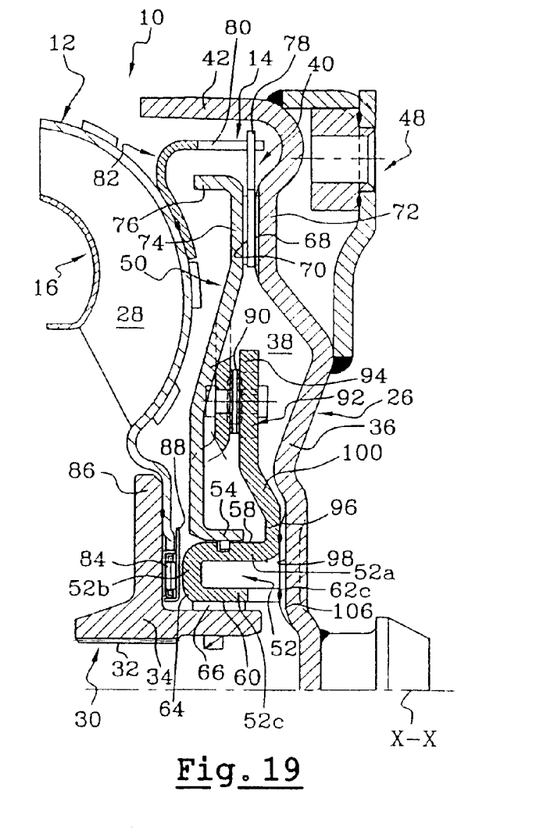

The eleventh embodiment shown in FIG. 19 is similar to the tenth embodiment, the only difference lying in the design of the twelfth tubular portion 52c which extends axially forward over an increased length, so as to come into engagement through its front axial annular end 62c so as to constitute, firstly, a point of engagement giving improved rigidity to the central sleeve 52, and also defining complementary points for joining with the transverse wall 36 by welding or adhesive bonding.

Holes 126 are of course formed for this purpose in the extension 52c to enable oil to pass.

Figure 20:
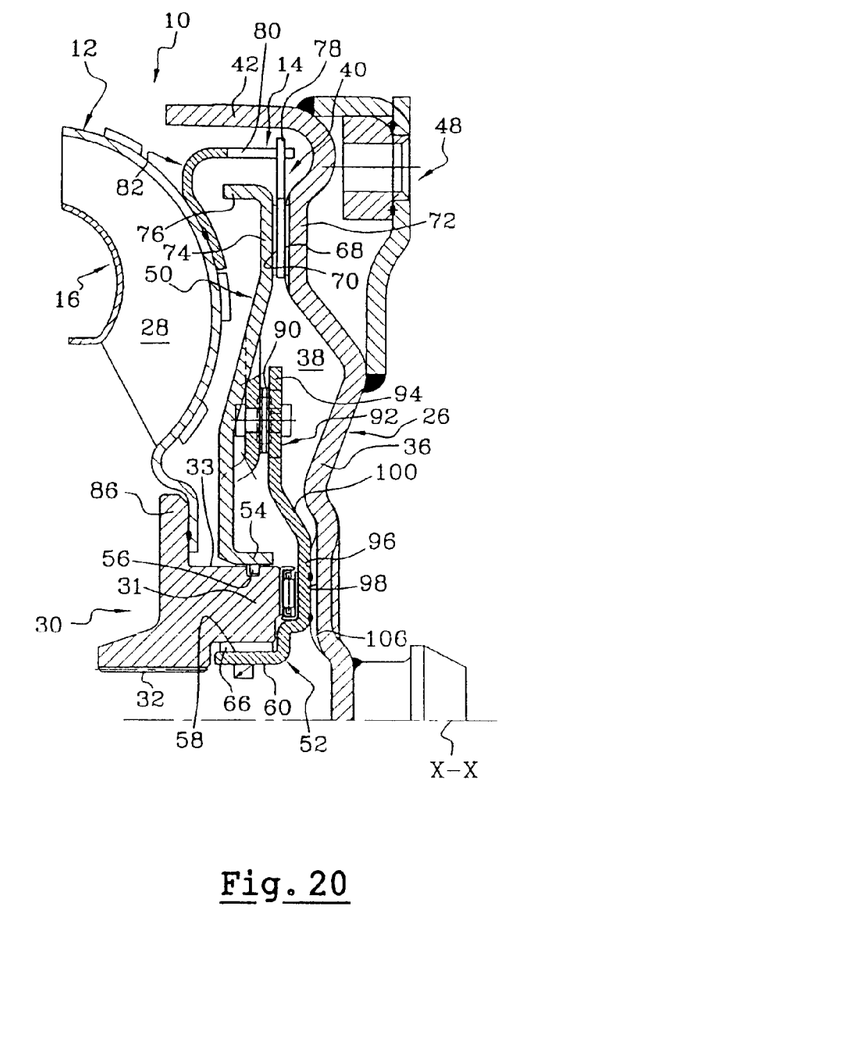

The twelfth embodiment shown in FIG. 20 is similar to the ninth embodiment shown in FIG. 17, in that the central portion 96 is extended by an axially oriented tubular portion which extends towards the rear to constitute the central sleeve 52, which is in one piece with the coupling disc 92.

However, it can be seen from a comparison between FIGS. 17 and 20 that in the twelfth embodiment, the front axial end portion 31 of the hub 30 is interposed radially between the convex cylindrical outer peripheral surface 58 of the central sleeve 62 and the axially oriented radially inner portion 54 of the piston 50, with the bearing element 66 being interposed between the sleeve 52 and the axial extension 31 of the hub 30, the convex cylindrical surface for sealed sliding movement of the inner periphery 54 of the piston 50 consisting in this example of the convex outer cylindrical wall 33 of the extension 31.

The invention is not limited to the embodiments described above.

In particular, it is possible to combine various techniques for coupling and fastening, such as welding, adhesive bonding and/or seaming, in order to obtain the various fastenings described above, especially between the main components consisting of the central sleeve 52, the coupling disc 92, 96 and the transverse wall 36 of the front half shell 26.

In the whole of the description, and in the description [sic], the coupling member 92 has been defined as an annular disc, that is to say as a continuous member of generally annular form. However, the invention is in no way limited to such a design and, without departing from the scope of the invention, it is possible to make the coupling member in the form of radially oriented arms which may or may not be joined together, the coupling function of such arms, and the possibilities that they offer, especially as regards fastening and coupling between the various components, being similar to those mentioned above in the case of an annular coupling member.

What is claimed is:

1. Hydrokinetic coupling apparatus, for a motor vehicle, including a generally transversely oriented wall (36) adapted to be coupled in rotation to a driving shaft, a central sleeve (52), and a piston (50) mounted for sealed sliding movement along a cylindrical surface (58) of the central sleeve (52) and defining, with the sleeve (52) and the transverse wall (36), a variable volume control chamber (38) which is bounded radially on the outside by at least one annular ring (40) which is adapted to be gripped between the piston (50) and the internal rear face of the transverse wall (36), and comprising an annular coupling disc (92) for coupling the piston (50) in rotation with the sleeve (52), which is disposed axially between the transverse wall and the piston (50) and which includes a central portion (96) extending radially inwards in facing relationship with an annular internal surface portion (98) of the transverse wall (36), against which it is in axial engagement and to which it is directly or indirectly fixed, wherein the sleeve (52) is attached axially to said central portion (96) of the annular coupling disc (92), with respect to which the sleeve (52) is radially centred.

2. Apparatus according to claim 1, characterised in that the central portion (96) of the coupling disc (92) is interposed axially between an annular transverse front end surface (62) of the sleeve (52) and said annular rear inner surface portion (98) of the transverse wall (36).

3. Apparatus according to claim 2, characterised in that the central portion (96) of the coupling disc (92) is fixed to said annular front transverse end surface (62) of the sleeve (52) by one of welding and adhesive bonding.

4. Apparatus according to claim 2, characterised in that the central portion (96) of the coupling disc (92) is fixed to said annular transverse front end surface (62) of the sleeve (52) by seaming.

5. Apparatus according to claim 2, characterised in that the central portion (96) of the coupling disc (92) is fixed to said annular front transverse end surface (62) of the sleeve (52) in elastic mating engagement in the axial direction.

6. Apparatus according to claim 4, characterised in that the sleeve (52) includes a convex cylindrical surface for centring the central portion (96) of the coupling disc (92).

7. Apparatus according to claim 1, characterised in that the central portion (96) of the coupling disc (92) extends radially inwards beyond the sleeve (52), in particular to constitute a calibrated orifice for supplying oil to the control chamber.

8. Apparatus according to claim 1, characterised in that the central portion (96) of the coupling disc (92) is made in one piece with the sleeve (52).

9. Apparatus according to claim 8, characterised in that the central portion (96) of the coupling disc (92) is extended by at least one axially oriented annular first portion (52) which extends towards the rear, and of which the convex cylindrical peripheral surface (58) constitutes said cylindrical surface for sliding movement of the piston (50).

10. Apparatus according to claim 9, characterised in that said axially oriented annular first portion (52a) is extended radially inwards by a radially oriented annular portion (52b), and then by an axially oriented second annular portion (52c) which extends forward towards the inner face (98) of the transverse wall (36).

11. Apparatus according to claim 10, characterised in that the free front terminal edge of said axially oriented annular portion (52c) is in axial engagement against the said annular rear internal surface portion (98) of the transverse wall (36).

12. Apparatus according to claim 11, characterised in that the free front terminal edge of said axially oriented annular second portion (52c) is welded or adhesively bonded to said annular rear internal surface portion (98) of the transverse wall (36).

13. Apparatus according to claim 8, characterised in that the central portion (96) of the coupling disc (92) is extended radially inwards by an axially oriented annular portion (52) extending towards the rear, and in that an annular element (31) constituting a hub (31, 30) is interposed radially between the convex cylindrical peripheral surface (58) of the axially oriented annular portion (52) and the piston (50, 54) which is mounted for sliding movement on the convex cylindrical peripheral surface of the said annular element (31).

14. Apparatus according to claim 13, characterised in that the central portion (96) of the coupling disc (92) is fixed to said annular rear internal surface portion (98) of the transverse wall (36) by one of welding and adhesive bonding.

15. Apparatus according to claim 1, characterised in that fluid feed passages for the generally radially oriented variable volume control chamber (38) are formed at one of the interface between the central portion (96) of the coupling disc (92) and said annular rear internal surface portion (98) of the transverse wall (36), and the interface between the sleeve (52, 62) and the central portion (96) of the coupling disc (92).

16. Apparatus according to claim 15, characterised in that said passages are formed in one of bosses, slots, holes formed in the transverse wall, in the central portion of the coupling disc and in the sleeve.

17. Apparatus according to claim 1, characterised in that the annular coupling disc (92, 96) is connected to the piston (50) by means of elastically deformable tongues (90).

18. Apparatus according to claim 17, characterised in that the elastically deformable tongues (90) are made in one piece with the coupling disc (92, 94).

* * * * *